US008943124B2

(12) United States Patent  
Massey et al.

(10) Patent No.: US 8,943,124 B2  
(45) Date of Patent: Jan. 27, 2015

(54) SYSTEMS AND METHODS FOR CUSTOMIZING MOBILE APPLICATIONS BASED UPON USER ASSOCIATIONS WITH ONE OR MORE ENTITIES

(75) Inventors: Edward Branton Massey, Atlanta, GA (US); Karl Howard Chaffey, Epsom (NZ); Jonathan Eric Drudge, Alpharetta, GA (US); Calvin Grimes, Jr., Norcross, GA (US); Bradley Shayle Scott, St. Marys Bay (NZ); Amelia Slaughter Wilkinson, Dacula, GA (US)

(73) Assignee: Fiserv, Inc., Brookfield, WI (US)

( * ) Notice: Subject to any disclaimer, the term of this patent is extended or adjusted under 35 U.S.C. 154(b) by 210 days.

(21) Appl. No.: 13/230,440

(22) Filed: Sep. 12, 2011

(65) Prior Publication Data  
US 2013/0066942 A1 Mar. 14, 2013

(51) Int. Cl.  
    *G06F 15/16* (2006.01)  
    *G06F 3/048* (2013.01)  
    *H04M 1/725* (2006.01)  
    *H04W 4/18* (2009.01)

(52) U.S. Cl.  
    CPC ............... *G06F 15/16* (2013.01); *G06F 3/048* (2013.01); *H04M 1/72525* (2013.01); *H04W 4/18* (2013.01)  
    USPC .......................................... 709/203

(58) Field of Classification Search  
    USPC .......................................... 709/203  
    See application file for complete search history.

(56) References Cited

U.S. PATENT DOCUMENTS

| | | | | |
|---|---|---|---|---|
| 7,853,493 | B2 * | 12/2010 | DeBie et al. | 705/30 |
| 8,301,564 | B2 * | 10/2012 | Mon et al. | 705/43 |
| 2005/0037735 | A1 * | 2/2005 | Coutts | 455/411 |
| 2008/0305815 | A1 * | 12/2008 | McDonough | 455/466 |
| 2009/0119190 | A1 * | 5/2009 | Realini | 705/30 |
| 2009/0271287 | A1 * | 10/2009 | Halpern | 705/26 |
| 2011/0031002 | A1 * | 2/2011 | Sakai et al. | 174/257 |
| 2011/0061002 | A1 | 3/2011 | Bethune et al. | |
| 2011/0125838 | A1 * | 5/2011 | Rao | 709/203 |
| 2011/0178910 | A1 * | 7/2011 | Benefield et al. | 705/35 |
| 2011/0191160 | A1 * | 8/2011 | Blackhurst et al. | 705/14.38 |
| 2011/0191184 | A1 * | 8/2011 | Blackhurst et al. | 705/14.57 |
| 2011/0208629 | A1 * | 8/2011 | Benefield et al. | 705/35 |
| 2011/0208822 | A1 * | 8/2011 | Rathod | 709/206 |

(Continued)

OTHER PUBLICATIONS

Non-Final Office Action for U.S. Appl. No. 13/230,413 mailed Aug. 14, 2013.

(Continued)

*Primary Examiner* — Moustafa M Meky  
*Assistant Examiner* — Blake Rubin  
(74) *Attorney, Agent, or Firm* — Sutherland Asbill & Brennan, LLP

(57) ABSTRACT

Systems and methods for customizing mobile applications are provided. The systems and methods may include a computer program product, comprising a computer-usable medium having a computer-readable program code adapted to be executed to implement a method for customizing a mobile application, said method comprising: receiving or retrieving information representative of (i) a user, and (ii) an entity that the user is affiliated with; delivering the information representative of (i) the user, and (ii) the entity that the user is affiliated with; receiving customization information associated with one or both of the user or the entity; and presenting a user interface for the user, the user interface reflecting at least a portion of the customization information.

20 Claims, 7 Drawing Sheets

(56) References Cited

U.S. PATENT DOCUMENTS

| | | | |
|---|---|---|---|
| 2012/0197743 A1* | 8/2012 | Grigg et al. | 705/16 |
| 2012/0203733 A1* | 8/2012 | Zhang | 707/600 |
| 2012/0215690 A1* | 8/2012 | Grinberg et al. | 705/42 |
| 2012/0254768 A1 | 10/2012 | Aggarwal et al. | |
| 2012/0254853 A1* | 10/2012 | Aggarwal et al. | 717/173 |
| 2012/0310692 A1* | 12/2012 | Maiya et al. | 705/7.13 |
| 2013/0066976 A1 | 3/2013 | Massey et al. | |
| 2013/0104113 A1* | 4/2013 | Gupta et al. | 717/169 |

OTHER PUBLICATIONS

Final Office Action for U.S. Appl. No. 13/230,413 mailed Dec. 5, 2013.

* cited by examiner

SYSTEMS AND METHODS FOR CUSTOMIZING MOBILE APPLICATIONS BASED UPON USER ASSOCIATIONS WITH ONE OR MORE ENTITIES

FIELD OF THE INVENTION

Aspects of the invention relate generally to mobile software applications, and more particularly to systems and methods for customizing mobile software applications based upon user associations with one or more entities.

BACKGROUND OF THE INVENTION

Many users may have banking relationships with more than one financial institution. In this situation, each financial institution can release its own version of a mobile application for use by its members. However, the functionality provided by these mobile applications is oftentimes substantially similar. Accordingly, there is an opportunity in the industry to support the downloading of a single mobile application with systems and methods for customizing the mobile application based upon a user association with one or more entities, which include, but are not limited to, one or more financial institutions or entities related to financial institutions.

BRIEF DESCRIPTION OF THE DRAWINGS

Reference will now be made to the accompanying drawings, which are not necessarily drawn to scale, and wherein.

DETAILED DESCRIPTION

Figure 1A:
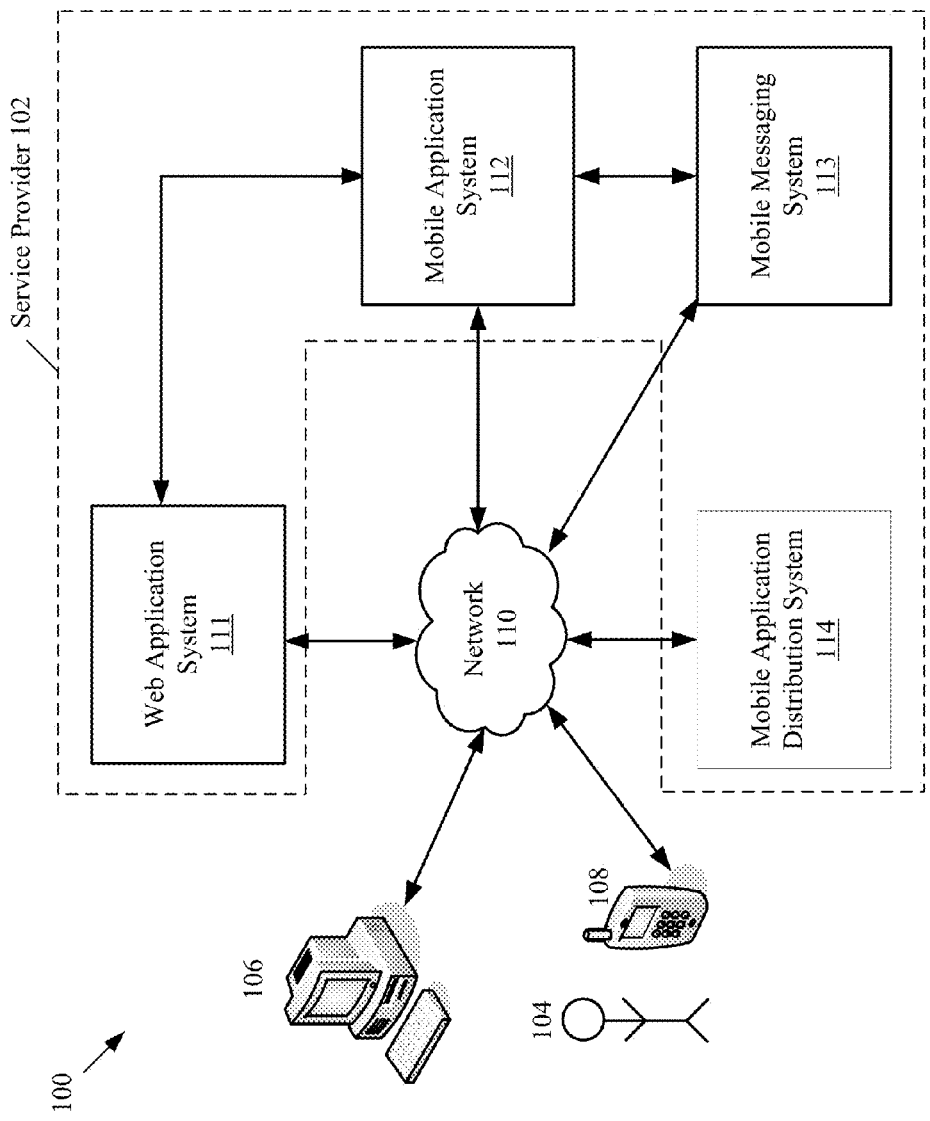
FIG. 1A illustrates an example system that facilitates customization of mobile applications, in accordance with an embodiment of the present invention.

The invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those of ordinary skill in the art. Like numbers refer to like elements throughout.

Embodiments of the invention may provide systems and methods for customizing mobile applications based upon user associations with one or more entities. In certain embodiments, the example system may facilitate the download, customization, and/or update of one or more mobile applications for one or more users. An example mobile application can be considered a "generic" mobile application insofar as substantially similar copies of the same mobile application can be downloaded to a mobile device and customized in accordance with a respective one of a plurality of different entities. For example, a copy of an example generic mobile application can be downloaded to a first mobile device for a first user and customized for use with Entity A with whom the first user is associated, while another copy of the same generic mobile application can be downloaded for a second user and customized for use with Entity B with whom the second user is associated with. In some embodiments, there may be different versions of generic mobile applications for different mobile devices or mobile device operating systems. For instance, there may be different versions of a generic application to facilitate its use with Android mobile devices, Windows mobile devices, BlackBerry mobile devices, Apple iOS mobile devices, and the like.

It will be appreciated that there may be a variety of entities that the mobile applications can be associated with or customized for. As an example, the entities can include financial entities or related entities such as banks, credit unions, credit card companies, lender institutions, brokerage institutions, and the like. However, in some embodiments, the entities can also be associated with non-financial institutions such as informational content providers such as aggregators, audio/video content providers, healthcare entities, and the like. Accordingly, as described herein, a mobile application can be customized based upon user associations with one or more entities. In some embodiments, a single entity can also be segmented into or considered as a plurality of sub-entities. For example, a single entity such as a financial institution can offer different plans or programs such that a user is assigned to one of those plans or programs (e.g., gold plan, silver plan, bronze plan, etc.). Accordingly, a mobile application can be customized based upon the user relationship to one of those plans or programs, where each plan or program may be associated with differing levels or types of customization. Thus, the entities described herein do not necessarily need to be separate legal entities, but can also include sub-entities, plans, or programs associated with a single legal entity, or a group of affiliated and/or unaffiliated legal entities, according to an example embodiment of the invention. Many variations of entities are available without departing from example embodiments of the invention.

I. System Overview

FIG. 1A illustrates an overview of an example system 100 that facilitates the customization of mobile applications based upon user associations with one or more entities, according to an example embodiment of the invention. In the system 100, there may be one or more service providers 102 that provide services to at least one user 104. The user 104 can access one or more service providers 102 using one or more computing devices, including one or more non-mobile computing devices 106 and/or mobile computing devices 108. In general, each non-mobile computing device 106 and/or mobile computing device 108 may be a suitable processor-driven device associated with or accessible by a user 104. Examples of non-mobile computing devices 106 can include desktop computers, server computers, laptop computers, and the like. Examples of mobile computing devices 108 can include tablet computers and/or smart phones, which may include, but are not limited to, Blackberry devices or phones, Apple iPhones and other iOS phones, Android-based devices or phones, and the like. An example implementation for a mobile computing device 108 will be described in further detail with respect to FIG. 2.

As will be described herein, one or more service providers 102 can facilitate the download, customization, and/or update of one or more mobile applications for one or more mobile computing devices 108 for one or more users 104, according to an example embodiment of the invention. One or more service providers 102 can communicate with the one or more mobile computing devices 108 via a network 110, which can include one or more separate or shared private and/or public networks, including the Internet, a cellular network, or a publicly switched telephone network, as described in further detail herein.

In some example embodiments of the invention, a service provider 102 may be comprised of a plurality of systems, including a web application system 111, a mobile application system 112, a mobile messaging system 113, and/or a mobile application distribution system 114. In an alternative embodiment, the functionality of at least a portion of the systems 111-114 may be combined into one or more other systems, according to an example embodiment. In some other embodiments, the service provider 102 may include only a portion of the systems 111-114. For example, a service provider 102 may include mobile application system 112 and mobile messaging system 113, but not include one or both of the web application system 111 and/or the mobile application distribution system 114, which may be provided by one or more other service providers. Many variations of the service provider 102 and the various systems 111-114 are available without departing from example embodiments of the invention.

The web application system 111 comprising one or more computers may be configured to facilitate Internet or web-based communications with one or more computing devices, including non-mobile computing device 106 and/or mobile computing device 108. For example, the user 104 can use an Internet browser of the non-mobile computing device 106 and/or the mobile computing device 108 to communicate with web application system 111 via network 110, which in this case may include the Internet or a similar public and/or private network. Alternatively, the non-mobile computing device 106 and/or the mobile computing device 108 may communicate with one or more of the systems 111-114 via a private or closed network or connection using, for example, a client-server model or any other suitable distributed application model.

The mobile application system 112 comprising one or more computers may be configured to facilitate communications with a mobile application of a mobile computing device 108 via network 110, which in this case may include the Internet, a cellular network (e.g., 3G, 4G, etc.), or the like. In an example embodiment of the invention, the mobile application can include a generic mobile application that can be customized in accordance with an example embodiment of the invention.

The mobile messaging system 113 comprising one or more computers may be configured to facilitate messaging or other communications with the mobile computing device 108 via network 110, which in this case may include the Internet, a cellular network (e.g., 3G, 4G, etc.), or the like. In some embodiments, the mobile messaging system 113 can facilitate messaging or other communications apart from those associated with the generic or customized mobile application. For example, the mobile messaging system 113 can facilitate messaging or other communications with the mobile computing device 108 via email, text messages (e.g., short messaging service ("SMS") messages, multimedia messaging service ("MMS") messages, etc.), instant messages, and other electronic messages. When "text messages" are referred to herein, it will be appreciated that they can include not only text, but also images or other multimedia messages, according to an example embodiment of the invention.

The mobile application distribution system 114 comprising one or more computers may facilitate the delivery of one or more mobile applications to the mobile computing device 108 via network 110, which in this case may include the Internet or a similar public and/or private network. In an example embodiment, the mobile application distribution system 114 can deliver or facilitate the delivery of the mobile application for installation on the mobile computing device 108. The mobile application of the mobile computing device 108 can then be customized or updated in accordance with example embodiments of the invention. It should be noted that there may be more than one mobile application distribution system 114, for example, to support mobile applications associated with different types of mobile devices or to provide adequate downloading performance.

It will also be appreciated that one or more of the systems 111-114 may be in communication with other ones of the systems 111-114 in accordance with example embodiments of the invention. In an example embodiment, web application system 111 may communicate with mobile application system 112, and mobile application system 112 may communicate with mobile messaging system 113. Accordingly, web application system 111 and/or mobile application system 112 may deliver requests and/or receive responses from each other. For example, the web application system 111 may deliver a request to the mobile application system 112 to facilitate a delivery of a mobile application or customization information to a mobile computing device 108. Similarly, mobile application system 112 and/or mobile messaging system 113 may deliver requests to and/or receive responses from each other. For example, the mobile application system 112 may deliver a request to the mobile messaging system 113 to deliver, to the mobile computing device 108, messaging that provides information associated with downloading a mobile application or customizing/updating a mobile application. Many variations of communications between two or more of the systems 111-114 are available without departing from example embodiments of the invention. An example variation may include the mobile application system 112 communicating with the mobile application distribution system 114 to facilitate the delivery of a mobile application to a mobile computing device 108.

It will be appreciated that many variations of FIG. 1A are available without departing from example embodiments of the invention.

Figure 1B:
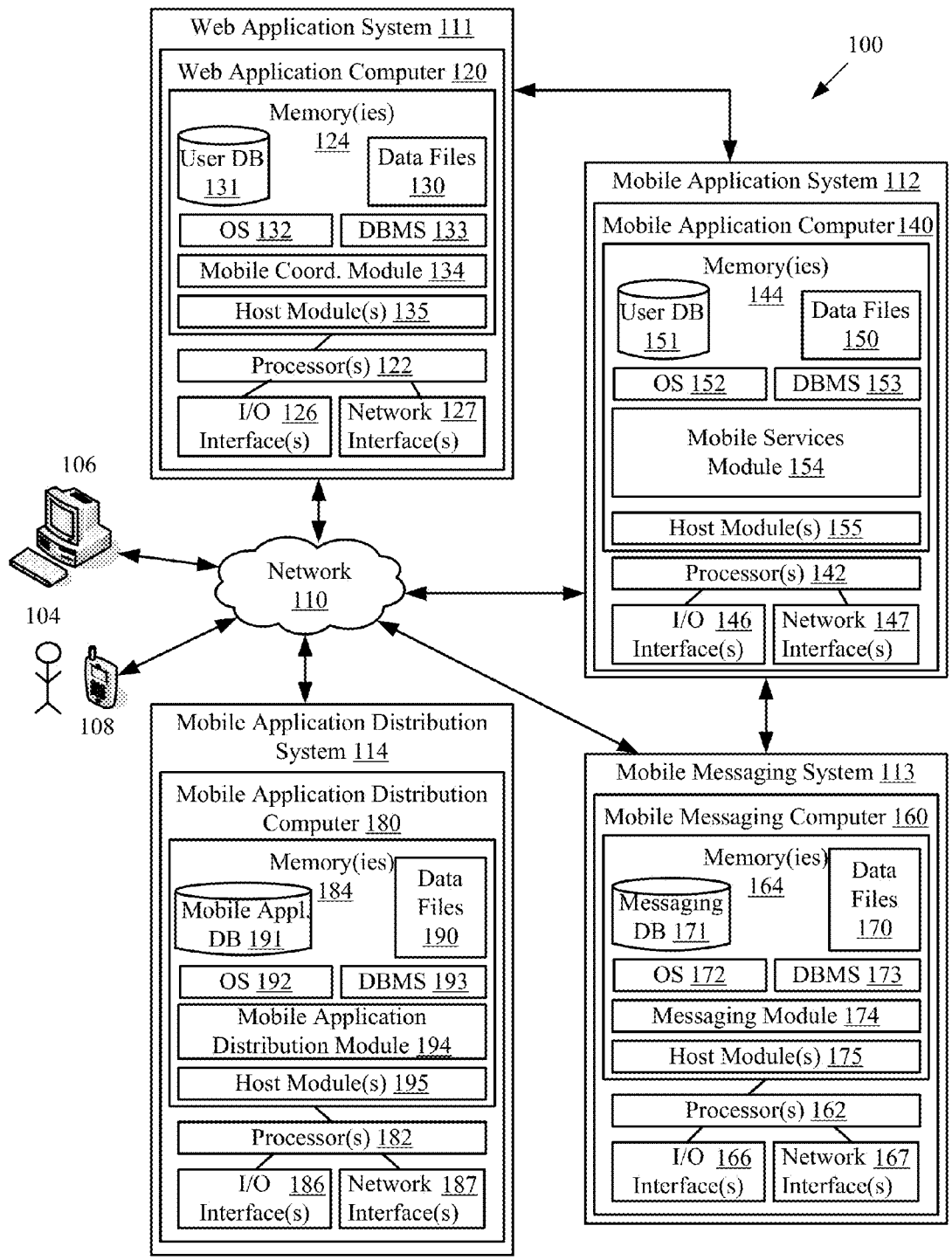
FIG. 1B illustrates example implementations of a system for customizing mobile applications, in accordance with an embodiment of the present invention.

FIG. 1B illustrates an example implementation for the system 100 of FIG. 1A, according to an example embodiment of the invention. In particular, FIG. 1B illustrates example implementations for the systems 111-114 introduced with respect to FIG. 1A. The one or more web application systems 111 may be associated with one or more web application computers 120. The one or more mobile application systems 112 may be associated with one or more mobile application computers 140. The one or more mobile messaging systems 113 may be associated with one or more mobile messaging computers 160. Similarly, the one or more mobile application distribution systems 114 may be associated with one or more mobile application distribution computers 180.

With continued reference to FIG. 1B, one or more user computing devices, including non-mobile computing device 106 and mobile computing device 108 may be provided for communicating with various ones of the systems 111-114 (and associated computers 120, 140, 160, 180) via one or more networks 110. The non-mobile computing device 106 may facilitate user 104 access to one or more services provided by the web application system 111 and/or the mobile application distribution system 114. Likewise, the mobile computing device 108 may facilitate user access to one or more services provided by the web application system 111, the mobile application system 112, the mobile messaging system 113, and/or the mobile application distribution system 114.

For simplicity, the computers, devices, and/or entities illustrated in FIG. 1B may be referenced in the singular, but it is appreciated that the same description applies to embodiments including multiple computers, devices and/or entities. Similarly, for each of the computers described herein, it is appreciated that the computer may include any number of suitable computers, components, and/or functionalities.

As shown in FIG. 1B, one or more of the web application system(s) 111, the mobile application system(s) 112, mobile messaging system(s) 113, the mobile application distribution system(s) 114, non-mobile computing device(s) 106, and/or mobile computing device(s) 108 may be in communication with each other via any number of suitable networks 110, which, as described below, can include one or more separate or shared private and/or public networks, including the Internet, a cellular network, or a publicly switched telephone network. More specifically, according to various embodiments, a user may utilize a non-mobile computing device 106 and/or a mobile computing device 108 to access one or more services provided by other components of the system 100. To facilitate the provision of one or more services to a user, one or more network communications sessions may be established between the user device 106 and/or the user device 108 and one or more other components of the system 100.

As desired, the web application system 111, the mobile application system 112, the mobile messaging system 113, and/or the mobile application distribution system 114 may be associated with one or more service providers such as service provider 102 described with respect to FIG. 1A. For example, each of the systems 111-114 may be associated with the same service provider. In this example embodiment, various software modules may facilitate the provision of certain services, and information may be shared between the software modules utilizing any number of suitable application service calls, data exchanges, shared data, requests, and/or responses. Alternatively, there may be two or more service providers that operate one or more respective ones of systems 111-114. It will be appreciated that a service provider may be operated by a particular entity to provide services to users associated with the entity, or it may be an independent service provider to provide services on behalf of a plurality of entities to their respective users. As an example of the latter case, a financial institution may contract with one or more service providers to allow its users to access one or more services of any of systems 111-114 via one or more non-mobile computing devices 106 and/or mobile computing devices 108. For example, a customer (e.g., a user 104 using computing devices 106, 108) of the financial institution may access online banking services from a website of the financial institution system (or a service provider hosted system). Based upon a request, the customer may be redirected by the financial institution system to the web application system 111 and/or mobile application system 112, according to an example embodiment of the invention. In certain embodiments, the redirection may be transparent to the customer. In other words, it may appear to the customer that services are continuing to be provided by the financial institution system. In yet another alternative, at least one of the web application system 111, the mobile application systems 112, the mobile messaging systems 113, and/or the mobile application distribution systems 114 may be operated and/or maintained by a financial institution. For example, the web application system 111 and/or the mobile application system 112 may be incorporated into a financial institution system different from those operated by a service provider providing systems 113 and 114. Indeed, the various components of the system 100 may be integrated and/or distributed in a wide variety of different ways.

With continued reference to FIG. 1B, the web application system 111 may include any number of web application computers 120 for providing one or more web-based services. An example web application computer 120 may be any suitable processor-driven device that facilitates the provision of web application services, such as a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. For example, the user 104 may utilize an Internet browser of the non-mobile computing device 106 or the mobile computing device 108 to access Web-based or Internet-based services from the web application system 111, such as, but not limited to, one or more of the following services accessible from an Internet website or portal: viewing account balances and transaction information, directing a bill payment or monetary transfer to a person or an account, registering for or requesting mobile application access, setting associated mobile application access preferences, etc. Other types of services can be available without departing from example embodiments of the invention.

The execution of suitable computer-implemented instructions by the web application computer 120 may form a special purpose computer or other particular machine that is operable to facilitate the provision of one or more web application services. Additionally, a special purpose computer or other particular machine may be formed that is operable to provide the web application services described herein. Although a single web application computer 120 is described herein, the operations and/or control of the web application computer 120 may be distributed among any number of computers and/or processing components.

In addition to having one or more processors 122, the web application computer 120 may include one or more memory devices 124, one or more input/output ("I/O") interfaces 126, and one or more network interfaces 127. The memory devices 124 may be any suitable memory devices, for example, caches, read-only memory devices, random access memory devices, magnetic storage devices, removable storage devices, etc. Additionally, any number of logical data storage constructs may be stored as desired within the memory devices 124, such as any number of suitable databases. The memory devices 124 may store a wide variety of data, such as data files 130 and/or a user database 131. Additionally, the memory devices 124 may store executable instructions and/or various program modules utilized by the web application computer 120, for example, an operating system ("OS") 132, a database management system ("DBMS") 133, a mobile coordination module 134, and/or one or more host modules 135.

The data files 130 may include any suitable data that facilitates the operations of the web application computer 120 and/or the provision of web application services to one or more users. For example, the data files 130 may include data associated with one or more web application services. For instance, the data files 130 can include data that facilitates the provisioning of web application services, including, but not limited to, entity-specific branding information, web-based presentation and display information, and the like. The user database 131 may include data associated with one or more users of the web application system 111 or subscribers to the web application system 111. For example, the user database 131 may include data associated with facilitating one or more of the following example web-based services: viewing account balances and transaction information, directing a bill payment or monetary transfer to a person or an account, registering for or requesting mobile application access, setting associated mobile application access preferences, etc. In this regard, the user database 131 can include user account information, transaction information, mobile application access information, etc. Other data can be stored in user database 131 to facilitate the provisioning of other types of services, according to an example embodiment of the invention. Any number of databases may be utilized as desired in various embodiments.

The OS 132 may be a suitable software module that controls the general operation of the web application computer 120. The OS 132 may also facilitate the execution of other software modules by the one or more processors 122, for example, the DBMS 133, the mobile coordination module 134, and/or the host modules 135. The OS 132 may be, but is not limited to, Microsoft Windows®, Apple OSX™, Linux, Unix, or a mainframe operating system. The DBMS 133 may be a suitable software module or application that facilitates the management of one or more databases, such as the user database 131 and/or the data files 130. The DBMS 133 may facilitate the access of stored information included in the databases and/or the writing of information to the databases. Additionally, in certain embodiments, the DBMS 133 may facilitate the access of information stored in one or more external databases, such as one or more databases associated with the mobile application system 112.

The mobile coordination module 134 may be a suitable software module that facilitates interactions between the user 104 and the mobile application system 112 and/or the mobile messaging system 113. In this regard, the mobile coordination module 134 may receive communications from a computing device 106, 108, including, for example, a mobile application request or any other request related to a mobile application. The mobile coordination module 134 can likewise provide instructions or coordinate the delivery of information to the mobile application system 112 and/or the mobile messaging system 113, as described herein. For example, user 104 may utilize non-mobile computing device 106 to deliver to the web application system 111 a mobile application request indicating a request to utilize a mobile application for mobile computing device 108. The mobile coordination module 134 can then deliver appropriate instructions to the mobile application system 112 and/or the mobile messaging system 113 to facilitate the download and/or customization of mobile applications for mobile computing device 108.

The host module(s) 135 may facilitate interaction between the web application system 111 and any number of users. For example, a user may utilize a computing device 106, 108 to access a host module 135 and request web application services. The host module(s) 135 may include any number of suitable host modules, including various dedicated applications, that facilitate interaction with any number of computing devices 106, 108.

With continued reference to the web application computer 120, the one or more I/O interfaces 126 may facilitate communication between the web application computer 120 and one or more input/output devices, for example, one or more user interface devices, such as a display, keypad, mouse, pointing device, control panel, touch screen display, remote control, microphone, speaker, etc., that facilitate user interaction with the web application computer 120. The I/O devices may be utilized, for example, by operational support personnel and/or programmers to enter information into the web application computer 120. The I/O interfaces 126 may also be utilized to receive information. The one or more network interfaces 127 may facilitate connection of the web application computer 120 to one or more suitable networks, for example, the network 110. In this regard, the web application computer 120 may receive and/or communicate information to other components of the system 100, such as the mobile application system 112, the mobile messaging system 113, the mobile application distribution system 114, and/or the computing devices 106, 108.

It will be appreciated that many variations of the web application system 111 and/or the web application computer 120 are available without departing from example embodiments of the invention.

The mobile application system 112 may include any number of mobile application computers 140 for providing one or more mobile application services. An example mobile application computer 140 may be any suitable processor-driven device that facilitates the download and/or customization of mobile applications. An example mobile application computer 140 can also process and respond to requests from mobile computing devices 108. An example mobile application computer 140 may be any suitable processor-driven device that facilitates the provision of mobile application services, such as a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. For example, a user 104 may utilize a mobile application of a mobile computing device 108 to deliver authentication information to the mobile application system 112, and upon successful authentication, access one or more mobile application services. Example mobile application services for a financial system may include one or more of the following: viewing account balances and transaction information, directing a bill payment or monetary transfer to a person or an account, registering for or requesting mobile application access, setting associated mobile application access preferences, etc. Other types of mobile application services can be available without departing from example embodiments of the invention.

The execution of suitable computer-implemented instructions by the mobile application computer 140 may form a special purpose computer or other particular machine that is operable to facilitate the provision of one or more web application services. Additionally, a special purpose computer or other particular machine may be formed that is operable to provide the mobile application services described herein. Although a single mobile application computer 140 is described herein, the operations and/or control of the mobile application computer 140 may be distributed among any number of computers and/or processing components.

In addition to having one or more processors 142, the mobile application computer 140 may include one or more memory devices 144, one or more input/output ("I/O") interfaces 146, and one or more network interfaces 147. The memory devices 144 may be any suitable memory devices, for example, caches, read-only memory devices, random access memory devices, magnetic storage devices, removable storage devices, etc. Additionally, any number of logical data storage constructs may be stored as desired within the memory devices 144, such as any number of suitable databases. The memory devices 144 may store a wide variety of data, such as data files 150 and/or a user database 151, which may be the same as or similar to the user database 131. Indeed, in some embodiments, the user database 131 and the user database 151 may be a same database that is shared between or accessible by two or more computers, including the web application computer 120 and/or the mobile application computer 140. The user database 151 can also store one or more unique identifiers, codes, or tokens that may be representative of one or more associations between users and one or more entities, as further described herein. Additionally, the memory devices 144 may store executable instructions and/or various program modules utilized by the mobile application computer 140, for example, an operating system ("OS") 152, a database management system ("DBMS") 153, a mobile services module 154, and/or one or more host modules 155.

The data files 150 may include any suitable data that facilitates the operations of the mobile application computer 140 and/or the provision of mobile application services to one or more users 104. For example, the data files 150 may include data associated with one or more mobile application services. For instance, the data files 150 can include data that facilitates the provisioning of mobile application services, including, but not limited to, entity-specific branding information for one or more mobile applications, mobile application presentation and display information, and the like. The user database 151 may include data associated with one or more users 104 of the mobile application system 112 or subscribers to the mobile application system 112. For example, the user database 151 may include data associated with facilitating one or more of the following example mobile application services: viewing account balances and transaction information, directing a bill payment or monetary transfer to a person or an account, registering for or requesting mobile application access, setting associated mobile application access preferences, etc. In this regard, the user database 151 can include user account information, transaction information, mobile application access information, etc. Other data can be stored in user database 151 to facilitate the provisioning of other types of services, according to an example embodiment of the invention. Any number of databases may be utilized as desired in various embodiments.

The OS 152 may be a suitable software module that controls the general operation of the mobile application computer 140. The OS 152 may also facilitate the execution of other software modules by the one or more processors 142, for example, the DBMS 153, the mobile services module 154, and/or the host modules 155. The OS 152 may be, but is not limited to, Microsoft Windows®, Apple OSX™, Linux, Unix, or a mainframe operating system. The DBMS 153 may be a suitable software module or application that facilitates the management of one or more databases, such as the user database 151 and/or the data files 150. The DBMS 153 may facilitate the access of stored information included in the databases and/or the writing of information to the databases. Additionally, in certain embodiments, the DBMS 153 may facilitate the access of information stored in one or more external databases, such as one or more databases associated with the mobile application system 112.

The mobile services module 154 may be a suitable software module that facilitates interactions between a mobile computing device 108 and the mobile application system 112 and/or mobile messaging system 113. In this regard, the mobile services module 154 may communicate with a mobile application of a mobile computing device 108. The mobile services module 154 can likewise direct a mobile messaging system 113 to deliver information or messages to the mobile messaging system 113 using communications means different than that involving the mobile application. For example, the communications means can be associated with text messages, electronic mail, and/or instant messages.

The host module(s) 155 may facilitate interaction between the mobile application system 112 and any number of users. For example, a user may utilize a mobile computing device 108 to access a host module 155 and request mobile application services. The host module(s) 155 may include any number of suitable host modules, including various dedicated applications, that facilitate interaction with any number of mobile computing devices 108.

With continued reference to the mobile application computer 140, the one or more I/O interfaces 146 may facilitate communication between the mobile application computer 140 and one or more input/output devices, for example, one or more user interface devices, such as a display, keypad, mouse, pointing device, control panel, touch screen display, remote control, microphone, speaker, etc., that facilitate user interaction with the mobile application computer 140. The I/O devices may be utilized, for example, by operational support personnel and/or programmers to enter information into the mobile application computer 140. The I/O interfaces 146 may also be utilized to receive information. The one or more network interfaces 147 may facilitate connection of the mobile application computer 140 to one or more suitable networks, for example, the network 110. In this regard, the mobile application computer 140 may receive and/or communicate information to other components of the system 100, such as the web application system 111, the mobile messaging system 113, the mobile application distribution system 114, and/or the computing devices 106, 108.

It will be appreciated that many variations of the mobile application system 112 and/or the mobile application computer 140 are available without departing from example embodiments of the invention.

The mobile messaging system 113 may include any number of mobile messaging computers 160 for providing one or more messaging services. An example mobile messaging computer 160 may be any suitable processor-driven device that facilitates the delivery of electronic messages to users 104. An example mobile messaging computer 160 may be any suitable processor-driven device that facilitates the provision of messaging services, such as a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. For example, the mobile messaging computer 160 can deliver electronic messages, including email messages, text messages (e.g., SMS or MMS messages), instant messenger messages, and/or other electronic messages for receipt or retrieval by a user computing device such as the mobile computing device 108. Other types of messaging services can be available without departing from example embodiments of the invention.

The execution of suitable computer-implemented instructions by the mobile messaging computer 160 may form a special purpose computer or other particular machine that is operable to facilitate the provision of one or more messaging services. Additionally, a special purpose computer or other particular machine may be formed that is operable to provide the messaging services described herein. Although a single mobile messaging computer 160 is described herein, the operations and/or control of the mobile messaging computer 160 may be distributed among any number of computers and/or processing components.

In addition to having one or more processors 162, the mobile messaging computer 160 may include one or more memory devices 164, one or more input/output ("I/O") interfaces 166, and one or more network interfaces 167. The memory devices 164 may be any suitable memory devices, for example, caches, read-only memory devices, random access memory devices, magnetic storage devices, removable storage devices, etc. Additionally, any number of logical data storage constructs may be stored as desired within the memory devices 164, such as any number of suitable databases. The memory devices 164 may store a wide variety of data, such as data files 170 and/or a messaging database 171. Additionally, the memory devices 164 may store executable instructions and/or various program modules utilized by the mobile messaging computer 160, for example, an operating system ("OS") 172, a database management system ("DBMS") 173, a messaging module 174, and/or one or more host modules 175.

The data files 170 may include any suitable data that facilitates the operations of the mobile messaging computer 160 and/or the provision of messaging services to one or more users 104. For example, the data files 170 may include data associated with one or more messaging services. For instance, the data files 170 can include data that facilitates the provisioning of messaging services, including, but not limited to, protocols and specifications for delivery of messages via one or more communication types. The messaging database 171 may include data associated with one or more messages, including, for example, branding information for one or more messages for delivery. Other data can be stored in data files 170 and/or the messaging database 171 without departing from example embodiments of the invention. Any number of databases may be utilized as desired in various embodiments.

The OS 172 may be a suitable software module that controls the general operation of the mobile messaging computer 160. The OS 172 may also facilitate the execution of other software modules by the one or more processors 162, for example, the DBMS 173, the messaging module 174, and/or the host modules 175. The OS 172 may be, but is not limited to, Microsoft Windows®, Apple OSX™, Linux, Unix, or a mainframe operating system. The DBMS 173 may be a suitable software module or application that facilitates the management of one or more databases, such as the messaging database 171 and/or the data files 170. The DBMS 173 may facilitate the access of stored information included in the databases and/or the writing of information to the databases. Additionally, in certain embodiments, the DBMS 173 may facilitate the access of information stored in one or more external databases, such as one or more databases associated with the mobile messaging system 113.

The messaging module 174 may be a suitable software module that facilitates interactions between a mobile computing device 108 and the mobile messaging system 113, including the delivery of messages from the mobile application system 112 to the mobile computing device 108. For example, the messaging module 174 can likewise deliver or direct the delivery of information or messages to the mobile computing device 108 using, for example, the communications means associated with text messages, electronic mail, and/or instant messages.

The host module(s) 175 may facilitate interaction between the mobile messaging system 113 and any number of users. For example, the host module(s) 175 may include any number of suitable host modules, such as email servers and/or SMS/MMS processing applications, including various dedicated applications, that facilitate interaction with any number of mobile computing devices 108.

With continued reference to the mobile messaging computer 160, the one or more I/O interfaces 166 may facilitate communication between the mobile messaging computer 160 and one or more input/output devices, for example, one or more user interface devices, such as a display, keypad, mouse, pointing device, control panel, touch screen display, remote control, microphone, speaker, etc., that facilitate user interaction with the mobile messaging computer 160. The I/O devices may be utilized, for example, by operational support personnel and/or programmers to enter information into the mobile messaging computer 160. The I/O interfaces 166 may also be utilized to receive information. The one or more network interfaces 167 may facilitate connection of the mobile messaging computer 160 to one or more suitable networks, for example, the network 110. In this regard, the mobile messaging computer 160 may receive and/or communicate information to other components of the system 100, such as the web application system 111, the mobile application system 112, the mobile application distribution system 114, and/or the computing devices 106, 108.

It will be appreciated that many variations of the mobile messaging system 113 and/or the mobile messaging computer 160 are available without departing from example embodiments of the invention.

The mobile application distribution system 114 may include any number of mobile application distribution computers 180 for providing one or more mobile application distribution services. An example mobile application distribution computer 180 may be any suitable processor-driven device that facilitates the delivery of one or more mobile applications to one or more users 104. An example mobile application distribution computer 180 may be any suitable processor-driven device that facilitates the provision of mobile application distribution services, such as a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. For example, the mobile application distribution computer 180 can deliver one or more mobile applications for receipt, retrieval, or download by a user computing device such as the mobile computing device 108. Other types of mobile application distribution services can be available without departing from example embodiments of the invention.

The execution of suitable computer-implemented instructions by the mobile application distribution computer 180 may form a special purpose computer or other particular machine that is operable to facilitate the provision of one or more mobile application distribution services. Additionally, a special purpose computer or other particular machine may be formed that is operable to provide the mobile application distribution services described herein. Although a single mobile application distribution computer 180 is described herein, the operations and/or control of the mobile application distribution computer 180 may be distributed among any number of computers and/or processing components.

In addition to having one or more processors 182, the mobile application distribution computer 180 may include one or more memory devices 184, one or more input/output ("I/O") interfaces 186, and one or more network interfaces 187. The memory devices 184 may be any suitable memory devices, for example, caches, read-only memory devices, random access memory devices, magnetic storage devices, removable storage devices, etc. Additionally, any number of logical data storage constructs may be stored as desired within the memory devices 184, such as any number of suitable databases. The memory devices 184 may store a wide variety of data, such as data files 190 and/or a mobile application database 191. Additionally, the memory devices 184 may store executable instructions and/or various program modules utilized by the mobile application distribution computer 180, for example, an operating system ("OS") 192, a database management system ("DBMS") 193, a mobile application distribution module 194, and/or one or more host modules 195.

The data files 190 may include any suitable data that facilitates the operations of the mobile application distribution computer 180 and/or the provision of mobile application distribution services to one or more users 104. For example, the data files 190 may include data associated with one or more mobile application distribution services. For instance, the data files 190 can include data that facilitates the provisioning of mobile application distribution services, including, but not limited to, protocols and specifications for facilitating the delivery or download of one or more mobile applications. The mobile application database 191 may include one or more mobile applications available for delivery or retrieval. Other data can be stored in data files 190 and/or mobile application database 191 without departing from example embodiments of the invention. Any number of databases may be utilized as desired in various embodiments.

The OS 192 may be a suitable software module that controls the general operation of the mobile application distribution computer 180. The OS 192 may also facilitate the execution of other software modules by the one or more processors 182, for example, the DBMS 193, the mobile application distribution module 194, and/or the host modules 195. The OS 192 may be, but is not limited to, Microsoft Windows®, Apple OSX™, Linux, Unix, or a mainframe operating system. The DBMS 193 may be a suitable software module or application that facilitates the management of one or more databases, such as the mobile application database 191. The DBMS 193 may facilitate the access of stored information included in the databases and/or the writing of information to the databases. Additionally, in certain embodiments, the DBMS 193 may facilitate the access of information stored in one or more external databases, such as one or more databases and/or data files 190 associated with the mobile application distribution system 114.

The mobile application distribution module 194 may be a suitable software module that facilitates interactions between a mobile computing device 108 and the mobile application distribution system 114, including the delivery of one or more mobile applications from the mobile application distribution system 114 to the mobile computing device 108.

The host module(s) 195 may facilitate interaction between the mobile application distribution system 114 and any number of users. For example, the host module(s) 195 may include any number of suitable host modules such as a Web server, and may include various dedicated applications, that facilitate interaction with any number of mobile computing devices 108.

With continued reference to the mobile application distribution computer 180, the one or more I/O interfaces 186 may facilitate communication between the mobile application distribution computer 180 and one or more input/output devices, for example, one or more user interface devices, such as a display, keypad, mouse, pointing device, control panel, touch screen display, remote control, microphone, speaker, etc., that facilitate user interaction with the mobile application distribution computer 180. The I/O devices may be utilized, for example, by operational support personnel and/or programmers to enter information into the mobile application distribution computer 180. The I/O interfaces 186 may also be utilized to receive information. The one or more network interfaces 187 may facilitate connection of the mobile application distribution computer 180 to one or more suitable networks, for example, the network 110. In this regard, the mobile application distribution computer 180 may receive and/or communicate information to other components of the system 100, such as the web application system 111, the mobile application system 112, the mobile messaging system 113, and/or the computing devices 106, 108.

It will be appreciated that many variations of the mobile application distribution system 114 and/or the mobile application distribution computer 180 are available without departing from example embodiments of the invention.

The network(s) 110 may include any telecommunication and/or data networks, whether public, private, or a combination thereof, including, but not limited to, a local area network, a wide area network, an intranet, the Internet, intermediate handheld data transfer devices, publicly switched telephone networks, and/or any combination thereof and may be wired and/or wireless.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the invention should not be construed as being limited to any particular operating environment, system architecture, or device configuration.

Figure 2:
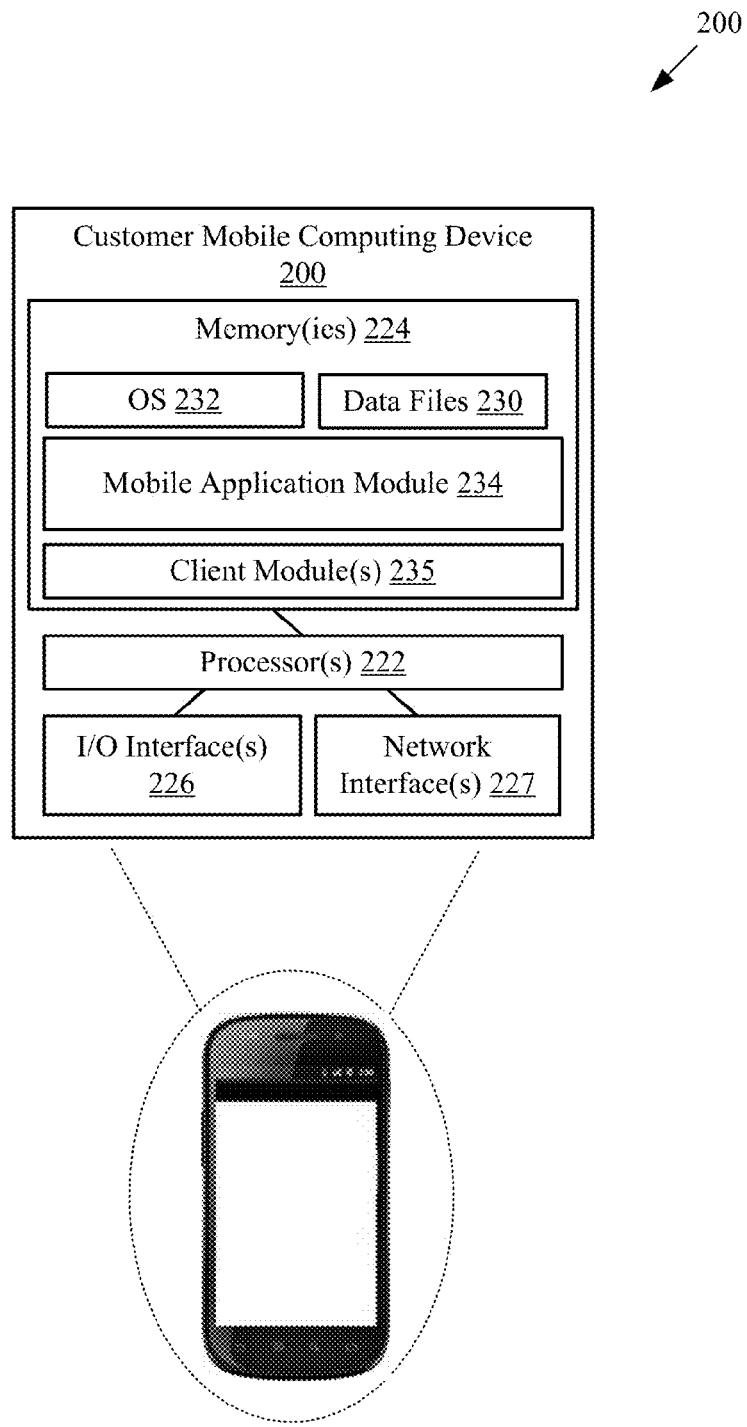
FIG. 2 illustrates an example implementation of a mobile computing device, in accordance with an embodiment of the present invention.

FIG. 2 illustrates an example mobile computing device 200, according to an example embodiment of the invention. The example mobile computing device 200 may be an example implementation for the mobile computing device 108 of FIGS. 1A and 1B.

An example mobile computing device 200 may be any suitable processor-driven device such as a smart phone, a tablet computer, a personal communication device, a digital assistant, a personal digital assistant, an Internet appliance, a minicomputer, a mobile computer, or any other processor-based device. In addition to having one or more processors 222, the mobile computing device 200 may include one or more memory devices 224, one or more input/output ("I/O") interfaces 226, and one or more network interfaces 227. The memory devices 224 may be any suitable memory devices, for example, caches, read-only memory devices, random access memory devices, magnetic storage devices, removable storage devices, etc. Additionally, any number of logical data storage constructs may be stored as desired within the memory devices 224, such as any number of suitable databases. The memory devices 224 may store a wide variety of data, such as data files 230. Additionally, the memory devices 224 may store executable instructions and/or various program modules utilized by the mobile computing device 200, for example, an operating system ("OS") 232, a mobile application module 234, and/or one or more client modules 235.

The data files 230 may include any suitable data that facilitates the operations of the mobile computing device 200 with one or more network components such as one or more of systems 111-114 of FIGS. 1A-1B, including, for example, authentication data, user data, transaction data, and the like. The OS 232 may be a suitable software module that controls the general operation of the mobile computing device 200. The OS 232 may also facilitate the execution of other software modules by the one or more processors 222, for example, the mobile application module 234, and/or the client module 235. The OS 232 may be, but is not limited to, Google Android, Apple iOS, RIM Blackberry OS, Microsoft Windows Phone, or any other mobile operating system.

The mobile application module 234 may be a suitable software module corresponding to a mobile application that is obtained from a source such as a mobile application distribution system 114. The mobile application module 234 may be configured to communicate, perhaps via the Internet or other network 110, communications with one or more mobile application systems 112 to obtain one or more mobile application services, as described herein.

With continued reference to the mobile computing device 200, the one or more I/O interfaces 226 may facilitate communication between the mobile computing device 200 and one or more input/output devices, for example, one or more user interface devices, such as a display, keypad, mouse, pointing device, control panel, touch screen display, remote control, microphone, speaker, etc., that facilitate user interaction with the mobile computing device 200. The I/O devices may be utilized, for example, by a user or customer to enter information into or receive information from the mobile computing device 200. The one or more network interfaces 227 may facilitate connection of the mobile computing device 200 to one or more suitable networks, for example, the network 110. In this regard, the mobile computing device 200 may receive and/or communicate information to network components such as the web application system 111, the mobile application system 112, the mobile messaging system 113, and/or the mobile application distribution system 114.

It will be appreciated that many variations of the example customer computing device 200 are available without departing from example embodiments of the invention.

II. Operational Overview

Figure 3A:
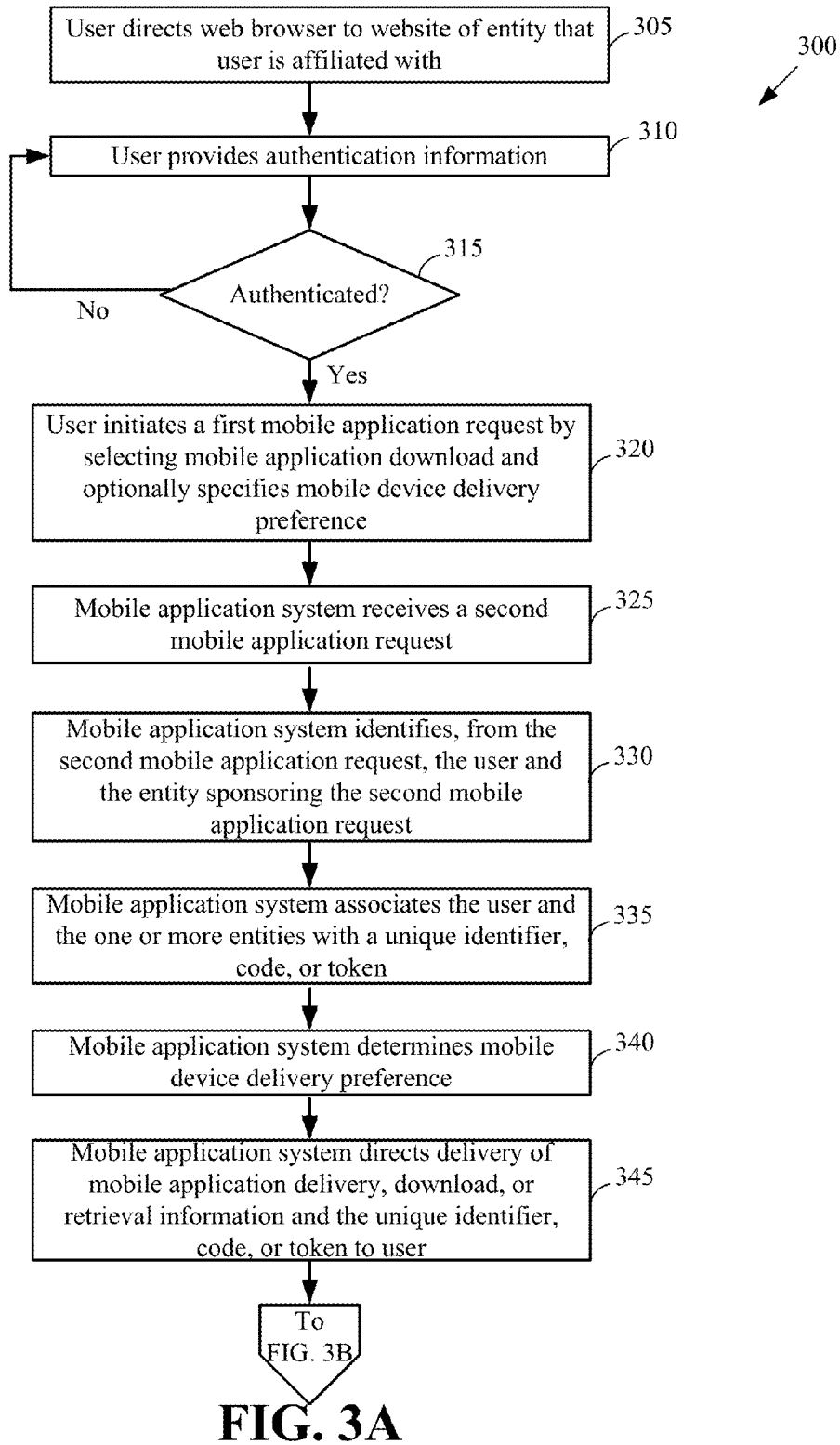
FIGS. 3A-3B illustrate an example implementation of a process for delivering a mobile application to one or more devices, in accordance with an embodiment of the present invention.
Figure 3B:
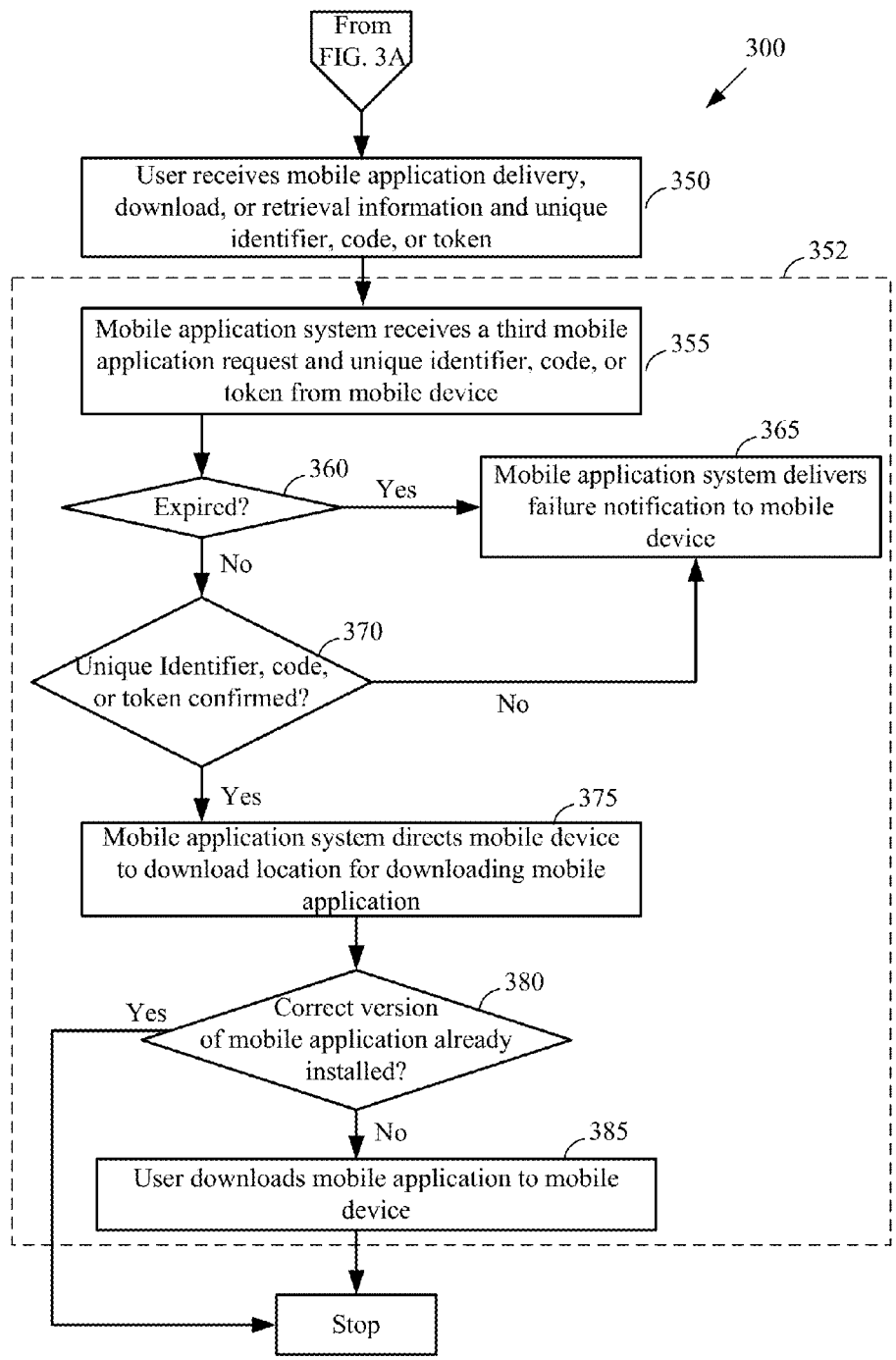

FIGS. 3A-3B illustrate a flow diagram of an example method 300 for delivering a mobile application to one or more mobile devices such as mobile computing device 108, according to an example embodiment of the invention. In certain embodiments, one or more operations of the method 300 may be performed by one or more computing devices 106, 108, or by one or more computers associated with a service provider 102, including one or more of those associated with systems 111-114, according to an example embodiment of the invention. The method 300 may begin at block 305.

At block 305, a user 104 may utilize an Internet/web browser of a computing device, such as computing device 106, 108, to access a website of an entity that the user 104 is affiliated with.

At the website, the user 104 can provide authentication information to the website, as illustrated by block 310. Authentication information can include, for example, at least a user name/ID and a password, although other types of authentication such as biometric authentication can be utilized. If the user is not successfully authenticated by the web application computer 120 at block 315, then processing may return to block 310, and the user 104 can reenter the authentication information or provide alternate or supplemental authentication credentials. On the other hand, if the user is successfully authenticated at block 315, then processing may proceed to block 320. In addition to authentication, other limitations to access may be implemented, such as authentication retry limit.

At block 320, the user 104 may interact with the website to obtain one or more web application services. For example, if the website is associated with a financial entity such as a bank, then the user 104 may be able to view account balances and transaction information, direct a bill payment or monetary transfer to a person or an account, register for or request mobile application access, set associated mobile application access preferences, etc. Other web application services can be available for websites associated with other entities. At block 320, the user 104 may initiate a first mobile application request by selecting a mobile application download or making any other selection relating to mobile application services. The first mobile application request may be any request that initiates a process for providing a mobile application to, or enabling the receipt of a mobile application by, a mobile computing device 108. For example, to initiate a first mobile application request, the website may enable the user 104 to request a mobile application for download and optionally specify one or more mobile device delivery preferences. Example mobile device delivery preferences can indicate whether information relating to a mobile application delivery, download, or retrieval should be delivered by SMS/MMS, email, instant message, website presentation, other electronic message, etc., according to an example embodiment of the invention. In this regard, the mobile device delivery preference can identify a telephone number (for an SMS/MMS message), an email address (for an email message), or an instant messenger identifier (for an instant message). Example mobile device delivery preferences can also indicate a type of mobile computing device 108 of the user 104, including, but not limited to, an operating system, brand, model number, or other type of mobile computing device 108. At block 320, the first mobile application request, which may specify any mobile device delivery preferences, can then be received by the web application computer 120.

Processing then continues with block 325. At block 325, the web application computer 120 can generate and transmit a second mobile application request, which may be received by the mobile application computer 140. Because the web application computer 120 has authenticated the user 104, the web application computer has identified the user 104. Accordingly, the second mobile application request transmitted by the web application computer 120 to the mobile application computer 140 can identify the user. The second mobile application request can also include one or more of the following information:

Entity Identifier: An entity that the user is associated with and that is likewise sponsoring or associated with the mobile application request. The entity may be associated with a mobile application and certain branding information for customizing the mobile application.

Mobile device delivery preferences: One or more preferences that indicate whether information related to a mobile application delivery, download, or retrieval should be delivered by text message, email, instant message, other electronic message, website presentation, etc. The mobile device delivery preferences can identify a telephone number (for a text message), an email address (for an email message), an instant messenger identifier (for an instant message), etc. Example mobile device delivery preferences can also indicate a type of mobile computing device 108 of the user 104, including but not limited to, an operating system, brand, model number, or other type of mobile computing device.

It will be appreciated that in an alternative embodiment, the first mobile application request and the second mobile application request may be the same request. For example, where the web application system 111 and the mobile application system 112 are provided in the same system, there may only be a single mobile application request. In other embodiments, the first mobile application request and the second mobile application request can include substantially the same information. In other embodiments, the web application computer 120 can include alternate or additional information in the second mobile application request compared to the first mobile application request without departing from example embodiments of the invention.

Following block 325 is block 330. At block 330, the mobile application system 112 (e.g., the mobile application computer 140) can identify, from the second mobile application request, the user 104 and the one or more entities associated with or sponsoring the second mobile application request. The mobile application system 112 can then, as shown in block 335, associate the user and the one or more entities with a unique identifier, code, or token. For example, there may be a unique identifier, code, or token representative of each relationship or association between a user and a particular entity (or account with that entity). Alternatively, there may be a unique identifier, code, or token representative of a plurality of relationships or association between a user and a plurality of entities (or accounts with those entities), according to an example embodiment of the invention. The unique identifier, code, or token may be utilized for purposes of customizing a mobile application for a user and/or one or more entities, according to an example embodiment of the invention.

Processing then continues with block 340. At block 340, the mobile application system 112 can determine the mobile device delivery preferences of the user 104 for use in delivering information regarding a mobile application delivery, download, or retrieval to the user 104. As described herein, mobile device delivery preferences may indicate whether information relating to a mobile application delivery, download, or retrieval should be delivered by SMS/MMS, email, instant message, or website presentation, according to an example embodiment of the invention. In an example embodiment, the mobile device delivery preferences can be obtained from the second mobile application request received from the mobile application. Alternatively, the mobile device delivery preferences may be default preferences or otherwise obtained from preferences, perhaps in user database 151 or another database, previously stored in association with an identity of the user 104.

Processing then continues with block 345. At block 345, the mobile application system 112 can direct delivery of the mobile application delivery, download, or retrieval information to the user 104 in accordance with the mobile device delivery preferences determined at block 340. The delivered information can include the unique identifier, code, or token for use in identifying at least one relationship between a user 104 and at least one entity. In an example embodiment, the mobile application system 112 can instruct the mobile messaging system 113 to deliver the mobile application delivery, download, or retrieval information to the user 104, perhaps via SMS/MMS, email, instant message, electronic message, or website presentation, depending upon the mobile device delivery preferences. For example, the mobile messaging computer 160 can include one or more of the following: an SMS/MMS server that delivers a text message to a telephone number of the mobile computing device 108, an email server that delivers an email message to an email address of the user 104, an instant messenger server that delivers an instant message to an instant messenger ID of the user, and/or a web server that delivers a web page presentation to an Internet browser of the computing devices 106, 108 of the user 104.

Processing then continues with block 350. At block 350, the user 104 may receive the mobile application delivery, download, or retrieval information, perhaps in a text message, email, instant message, other electronic message, or the like received from the mobile messaging system 113, according to an example embodiment of the invention. In one example embodiment of the invention, the mobile application delivery, download, or retrieval information may identify one or more steps or instructions for receiving, downloading, or retrieving the mobile application for a mobile computing device 108. The information may also include the unique identifier, code, or token discussed herein. For example, the information may include a hyperlink, a network link, or the like that a user 104 can activate on the mobile computing device 108 to download a mobile application. In some embodiments, the hyperlink or network link can include the unique identifier, code, or token, for example, embedded as part of one of the aforementioned links to form a "smartlink." The embedding of the unique identifier, code, or token can enable the unique identifier, code, or token to be automatically transmitted to a destination upon invocation of the smartlink. Accordingly, the user 104 can simply invoke the smartlink without separately entering or providing the unique identifier, code, or token, according to an example embodiment of the invention.

Following block 350 is block 352, which generally includes a process for downloading and installing a mobile application to a mobile computing device 108, according to an example embodiment. In some embodiments, the mobile application delivery, download, or retrieval information may simply provide instructions for accessing the mobile application distribution system 114 and downloading the mobile application. For example, the user 104 can use an Internet browser of a mobile computing device 108 to access a website supported by the mobile application distribution system 114 to identify and download the mobile application. In another example embodiment, a more secure process may be utilized for downloading and installing a mobile application to a mobile computing device 108, as described below starting with block 355.

Turning now to block 355, a user can invoke the hyperlink, network link, or smartlink from the mobile computing device 108 for which the mobile application is to be downloaded and installed. In an example embodiment, the invocation of the hyperlink, network link, or smartlink can result in the launching of an Internet browser and the generation of a third mobile application request being delivered to either the mobile application system 112 (or alternatively to the mobile application distribution system 114). In some embodiments, if a smartlink is invoked, then the unique identifier, code, or token can be delivered as part of the third mobile application request or in association with the third mobile application request. Otherwise, the user 104 may need to separately enter or provide, perhaps on a webpage form, the unique identifier, code, or token to the mobile application system 112 (or alternatively to the mobile application distribution system 114).

Following block 355 is block 360. Block 360 may determine whether the received identifier, code, or token has expired. Indeed in some example embodiments, each unique identifier, code, or token may have an expiration or time limit to control access to or receipt of the mobile application. If the received identifier, code, or token has expired, then processing may proceed to block 365, where the mobile application system 112 can deliver a failure notification to the mobile computing device 108. The failure notification can indicate that the unique identifier, code, or token has expired, and may request that the user restart the process according to block 305 discussed herein or otherwise take steps to reactivate or regenerate a unique identifier, code, or token.

If block 360 determines that the received identifier, code, or token has not expired, then processing may proceed to block 370. Block 370 may determine whether the received identifier, code, or token can be authenticated or confirmed. For example, at block 370, the mobile application system 112 can determine whether the received identifier, code, or token matches one of the previously generated unique identifiers, codes, or tokens (e.g., perhaps stored in user database 151). If block 370 determines that the received identifier, code, or token cannot be authenticated or confirmed, then processing may proceed to block 365, where the mobile application system 112 can deliver a failure notification to the mobile computing device 108. The failure notification can indicate that the received identifier, code, or token is incorrect or otherwise cannot be authenticated or confirmed. On the other hand, block 370 can authenticate or confirm the received identifier, code, or token, and processing may proceed to block 375.

At block 375, the mobile application system 112 can direct the Internet browser or other application of the mobile computing device 108 to a download location for downloading the mobile application. In an example embodiment of the invention, the download location may include an Internet website or other network-accessible location that is provided by or supported by the mobile application distribution system 114. In an example embodiment, the mobile application system 112 may detect the operating system, type, or brand of mobile computing device 108 based upon communications (e.g., the third mobile application request) received from the mobile computing device 108. Based upon the identified operating system, type, or brand, the mobile application system 112 can direct the mobile computing device 108 to a download location that provides a mobile application that is compatible with the operating system, type, or brand of the mobile computing device 108. For example, if the mobile computing device 108 is an iPhone, then the mobile application system 112 can direct the mobile computing device 108 to a download location of an iOS-compatible mobile application. Likewise, if the mobile computing device 108 utilizes an Android-based operating system, then the mobile application system 112 can direct the mobile computing device 108 to a download location of an Android-compatible mobile application. Many variations of mobile applications are available for different operating systems, types, or brands of mobile computing devices 108 without departing from example embodiments of the invention.

Following block 375, processing may proceed to block 380. Block 380 may determine whether the correct version of the mobile application is already installed on the mobile computing device 108. In an example embodiment, block 380 may involve the mobile application system 112 interacting with the mobile computing device 108 to determine whether the correct version of the mobile application is already installed. In an alternative embodiment, block 380 may involve the user 104 in determining whether the correct version of the mobile application is already installed on the mobile computing device 108. If block 380 determines that the correct version of the mobile application is already installed on the mobile computing device 108, then processing at FIG. 3B may end.

On the other hand, if block 380 determines that the correct version of the mobile application has not been installed on the mobile computing device 108, then processing may proceed to block 385. At block 385, the mobile application can be downloaded and installed on the mobile computing device 108.

The process 300 may end at either block 380 or block 385. It will be appreciated that many variations of FIGS. 3A and 3B are available without departing from example embodiments of the invention.

Figure 4A:
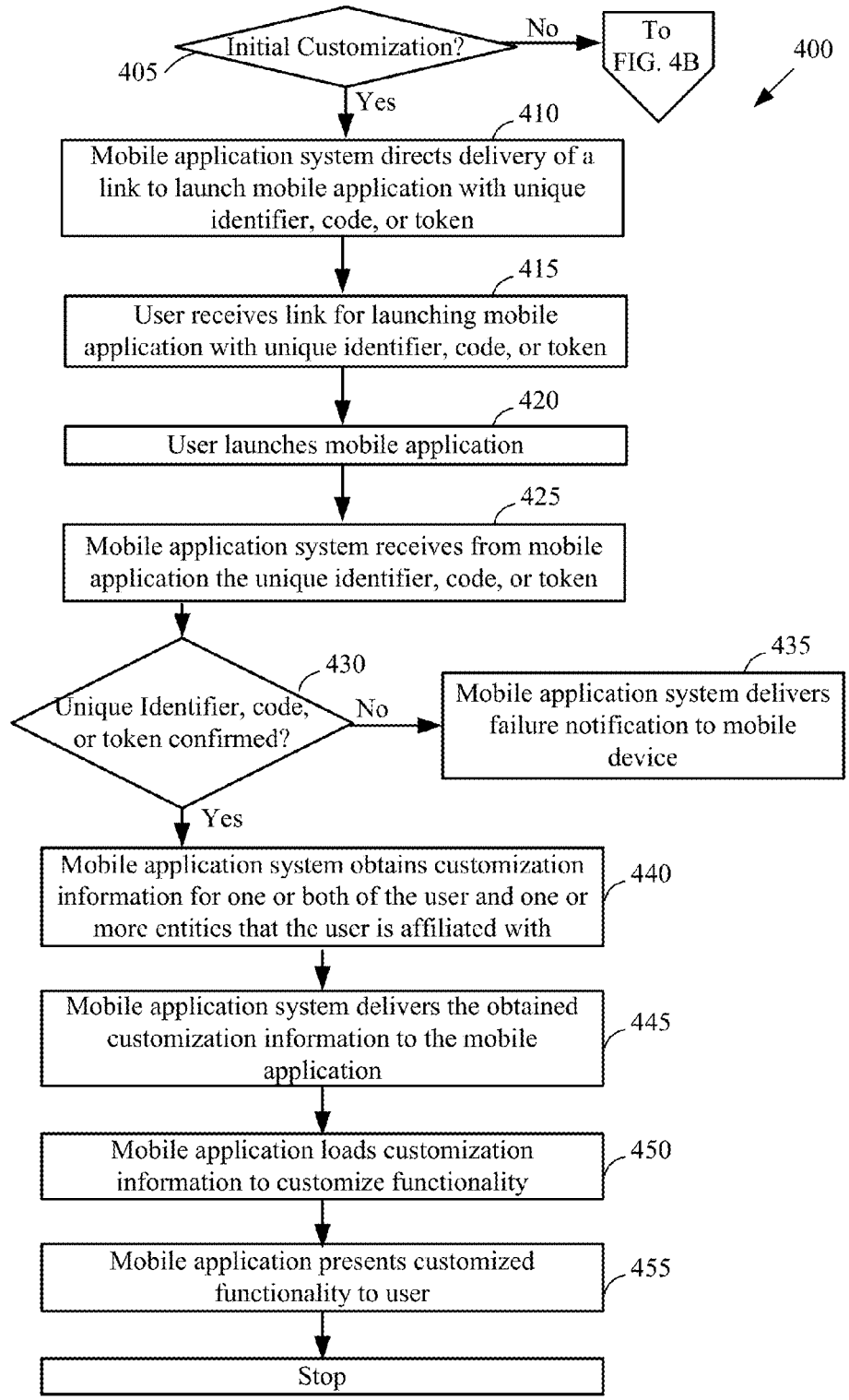
FIGS. 4A-4B illustrate an example implementation of a process for launching and customizing a mobile application, in accordance with an embodiment of the present invention.
Figure 4B:
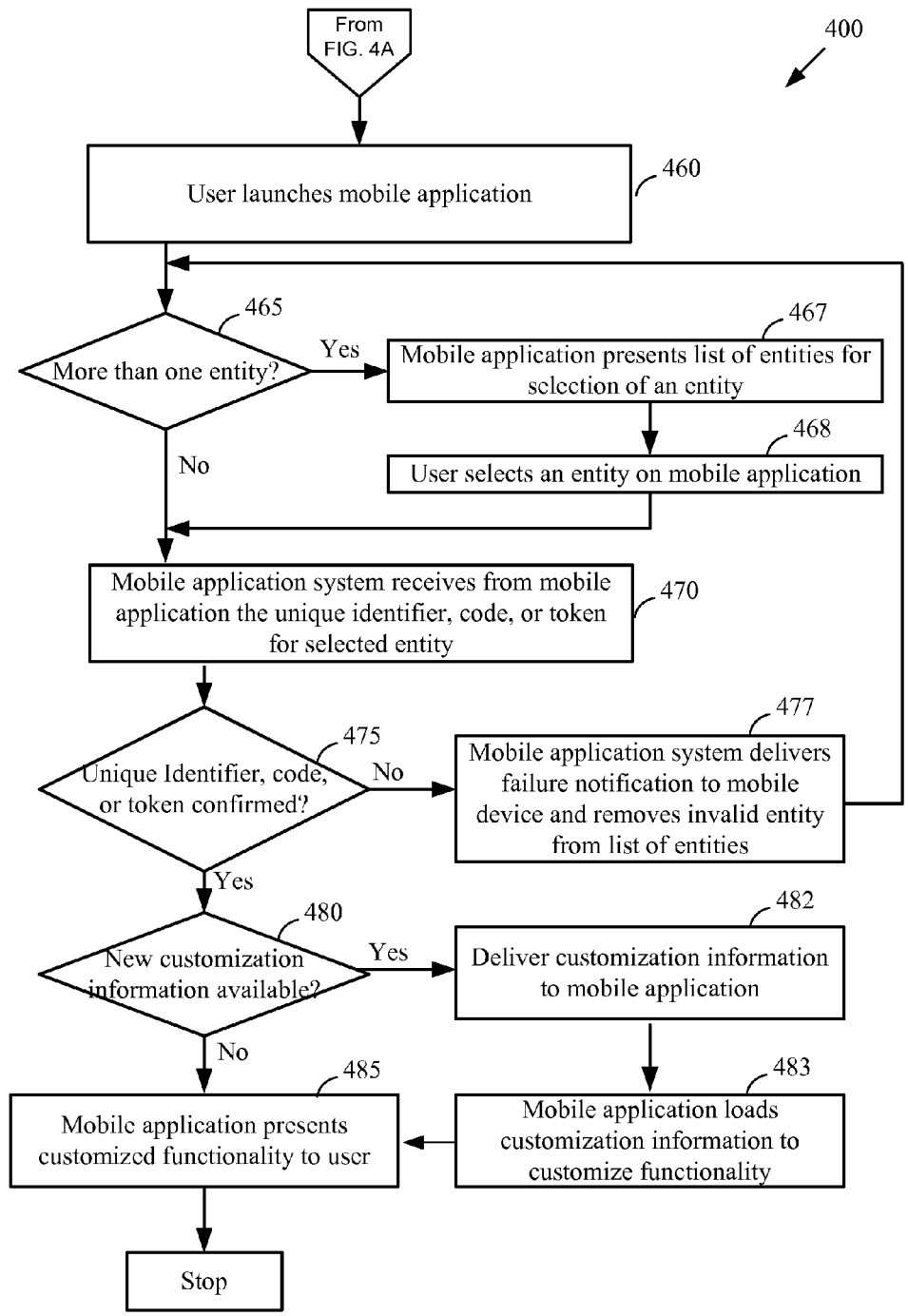

FIGS. 4A-4B illustrate an example processing flow of a method 400 for launching and customizing a mobile application in accordance with an example embodiment of the invention. In certain embodiments, one or more operations of the method 400 may be performed by one or more computing devices 106, 108, or by one or more computers associated with a service provider 102, including the mobile application computer 140, according to an example embodiment of the invention. The method 400 may begin at block 405.

As shown by block 405, the method 400 may proceed along one of two paths depending upon whether or not a prior or initial customization has been performed for the mobile application. If a prior or initial customization has been performed at block 405, then processing may proceed to block 460, which will be discussed in further detail below with respect to FIG. 4B. On the other hand, if a prior or initial customization has not been performed at block 405, then processing may proceed to block 410.

At block 410, the mobile application system 112 may direct delivery of a link to launch a mobile application with a unique identifier, code, or token. In an example embodiment of the invention, the link may be embodied as a smartlink having the unique identifier, code, or token embedded therein. For example, the smartlink may be configured, when invoked by the user 104, to launch the mobile application and to provide the unique identifier, code, or token to the launched mobile application. The mobile application system 112 can direct the delivery of the link or smartlink to the user 104 and/or the mobile computing device 108 in accordance with the user's mobile device delivery preferences, described above. Accordingly, the mobile application system 112 can direct the mobile messaging system 113 to deliver, to the user 104 and/or to the mobile computing device 108, the link to launch the mobile application with the unique identifier, code, or token.

Following block 410 is block 415. At block 415, the user 104 and/or the mobile computing device 108 may receive the link for launching the mobile application with the unique identifier, code, or token. In an example embodiment of the invention, the link may be received via text message, email, instant message, other electronic message, or the like according to an example embodiment of the invention.

It will be appreciated that many variations of blocks 410 and 415 are available. According to an example variation, the user 104 and/or mobile computing device 108 can receive simply the unique identifier, code, or token apart from any link for launching the mobile application. In this situation, the user 104 may be responsible for launching the mobile application and then supplying the unique identifier, code, or token, either by electronic entry (e.g., keypad entry) or uploading to the mobile application.

Following block 415 is block 420. At block 420, the user 104 can launch the mobile application from the mobile computing device 108. If a link was received at block 415, then the user can launch the mobile application by invoking (e.g., clicking on) the received link. The invocation of the received link can execute one or more commands that launch the mobile application of the mobile computing device 108. In conjunction with launching the mobile application, the invocation of the link can also result in the unique identifier, code, or token being supplied to the mobile application. In an alternative embodiment, the user 104 can manually enter or provide the unique identifier, code, or token to the mobile application.

Following block 420 is block 425. At block 425, the launched mobile application can communicate with the mobile application computer 140. The launched mobile application can deliver a copy of the unique identifier, code, or token to the mobile application computer 140. Accordingly, the mobile application system 112 can receive the unique identifier, code, or token from the mobile application of the mobile computing device 108. It will be appreciated that the unique identifier, code, or token may be representative of an identity of the user 104 and/or one or more relationships of the user 104 with one or more entities with whom the user 104 is affiliated or associated with. In an example embodiment of the invention, the unique identifier, code, or token may be stored in memory device 224 or other similar memory or database for subsequent use and retrieval.

Following block 425 is block 430. Block 430 may determine whether the received identifier, code, or token can be authenticated or confirmed. For example, at block 430, the mobile application system 112 can determine whether the received identifier, code, or token matches one of the previously generated unique identifiers, codes, or tokens (e.g., perhaps stored in user database 151). If block 430 determines that the received identifier, code, or token cannot be authenticated or confirmed, then processing may proceed to block 435, where the mobile application system 112 can deliver a failure notification to the mobile computing device 108. The failure notification can indicate that the received identifier, code, or token is incorrect or otherwise cannot be authenticated or confirmed. On the other hand, block 430 can authenticate or confirm the received identifier, code, or token, and processing may proceed to block 440.

At block 440, the mobile application system 112 may obtain customization information for one or both of the user 104 and one or more entities that the user is affiliated with. As an example, the received unique identifier, code, or token can identify at least the user 104. Accordingly, customization information, such as personalized security or authentication challenge information, can be obtained for the user 104 associated with the unique identifier, code, or token. It will be appreciated that the customization information may have been previously selected or provided by the user 104, according to an example embodiment of the invention. In an example embodiment of the invention, the unique identifier, code, or token can also be used, either directly or indirectly, to identify one or more entities that the user 104 is affiliated or associated with. For example, the unique identifier, code, or token can be directly linked to one or more stored records that show an association between the user and one or more entities. On the other hand, if the unique identifier, code, or token is directly linked to only an identity of the user, then a second search may need to be performed to identify one or more other records showing a relationship between the identified user 104 and one or more entities that the user is affiliated or associated with. Once the one or more entities that the user is affiliated with or associated with have been identified, then respective customization information for each entity may be obtained. In an example embodiment of the invention, the customization information for each entity may be stored in a local database or a network database accessible to the mobile application system 112. The customization information can include images/logos, text, color schemes, or functionality options that are specific to each entity.

Following block 440 is block 445. At block 445, the mobile application system 112 may deliver the obtained customization information to the mobile application of the mobile computing device 108. In an example embodiment of the invention, synchronous or asynchronous communications, including Internet-based transfers, may be used for delivering the customization information to the mobile application of the mobile computing device 108.

Following block 445 is block 450. At block 450, the mobile application loads the customization information to customize functionality of the mobile application. Accordingly, the mobile application, which may have been "generic," may now be customized with the customization information. Thus, the customized mobile application can now have the desired "look and feel" that is desired by a particular entity.

Following block 450 is block 455. At block 455, the mobile application can present the customized functionality to the user 104. In this regard, if the customization information included user customization, then the mobile application can present the user-customized functionality, including user-selected authentication challenges, images, and the like. Additionally, the customization information can also show customized images, text, color schemes, and/or other functionality options, which may be particular to an entity affiliated with or associated with the user 104, in accordance with the customization information.

Returning now to block 405, a prior customization or initial customization of the mobile application may have been performed, and processing may proceed to block 460 of FIG. 4B. At block 460, a user 104 may launch, initiate, or execute the mobile application of the mobile computing device 108. For example, the user 104 can launch the mobile application by selecting or clicking an icon from the mobile computing device 108. Many alternative methods for launching, initiating, or executing the mobile application are available, including but not limited to, executing the mobile application via a command line, an Internet browser window, etc.

Following block 460 is block 465. At block 465, the mobile application may determine whether mobile application functionality is available for more than one entity affiliated or associated with the user 104. For example, the mobile application may identify any stored unique identifiers, codes, or tokens available (e.g., stored locally or otherwise accessible). Where each unique identifier, code, or token is associated with a respective relationship or association between a user 104 and a particular entity, the presence of multiple identifiers, codes, or tokens may likewise indicate the existence of multiple affiliated or associated entities. Alternatively, there may be one or more records stored with the mobile computing device 108, perhaps in memory 224, that indicate whether the mobile application has been configured to provide mobile services on behalf of more than one entity. In yet another alternative embodiment, a unique identifier, code, or token may be associated with multiple relationships or associations between a user 104 and a plurality of entities. In this case, the mobile application may deliver the unique identifier, code, or token to the mobile application system 112, and the mobile application system 112 can indicate whether the user 104 is associated with more than one entity. Accordingly, block 465 may determine whether mobile access via the mobile application is available for more than one entity.

If block 465 determines that mobile access via the mobile application is available for more than one entity, then processing may proceed to block 467. At block 467, the mobile application can present or display a list or identification of the available entities to allow the user 104 to select one of the available entities to access mobile application services for.

For example, the user interface of the mobile application can display in textual and/or graphical form the identification of the available entities to allow the user 104 to select one of them. The identification of the entities may, in certain embodiments, be at least partially based on information taken from local storage in association with a respective identifier, token, or code, or obtained from an interaction with the mobile application system 112. Following block 467 is block 468, where the user 104 selects one of the available entities. The user may make a selection by using a touch screen, clicking a mouse, making a textual entry, making a verbal selection, or using virtually any other similar type of selection method, according to an example embodiment of the invention.

It will be appreciated that variations of blocks 465, 467, and 468 are available without departing from example embodiments of the invention. According to one variation, the mobile application can list all entities that are supported by the mobile application. The user 104 may be associated or affiliated with only a portion of the listed entities. However, the user 104 can then select one of the listed entities that the user is associated with or affiliated, and for which the user 104 wishes to access mobile services via the mobile application.

Following block 468 is block 470. Block 470 may also be reached where block 465 determines that mobile access via the mobile application is available for only a single entity. At block 470, the mobile application of the mobile computing device 108 may deliver the unique identifier, code, or token for the selected entity to the mobile application system 112. As such, a mobile application computer 140 of the mobile application system 112 may receive the unique identifier, code, or token from the mobile computing device 108.

Following block 470 is block 475. Block 475 may determine whether the received identifier, code, or token can be authenticated or confirmed. For example, at block 475, the mobile application system 112 can determine whether the received identifier, code, or token matches one of the previously generated unique identifiers, codes, or tokens (e.g., perhaps stored in user database 151). If block 475 determines that the received identifier, code, or token cannot be authenticated or confirmed, then processing may proceed to block 477, where the mobile application system 112 can deliver a failure notification to the mobile computing device 108. The failure notification can indicate that the received identifier, code, or token is incorrect or otherwise cannot be authenticated or confirmed. In addition, the selected entity may then be removed from the list of available entities with which the user is associated or registered, and the process may return to block 465. On the other hand, block 475 can authenticate or confirm the received identifier, code, or token, and processing may proceed to block 480.

At block 480, the mobile application system 112 can determine whether any new or updated customization information is available for the user 104 and/or the selected entity affiliated or associated with the user 104. For example, the mobile application system 112 may maintain one or more records indicating what customization information, or version thereof, was previously delivered to the mobile application of the mobile computing device 108 of the user 104. Alternatively, the mobile application can provide information regarding the current customization information to the mobile application system 112. Accordingly, if the mobile application system 112 determines that new or updated customization information is available for the user 104 and/or the selected entity, then processing may proceed to block 482.

At block 482, the mobile application system 112 can obtain the new or updated customization information for one or both of the user 104 and/or the entity that the user 104 is affiliated or associated with. As described herein, user 104 customization information can include authentication information, including but not limited to, personalized security or authentication challenge information. Likewise, the customization information for the entity can include, but is not limited to, images/logos, text, color schemes, or functionality options that are specific to the selected entity. At block 482, the mobile application system 112 can deliver the new or updated customization information to the mobile computing device 108 for customizing the mobile application. At block 483, the mobile application can load the received customization to customize the mobile application for the user 104 and/or the selected entity that the user 104 is affiliated or associated with.

At block 485, the mobile application can present the customized functionality to the user 104. In this regard, if the customization information included user customization, then the mobile application can present the user-customized functionality, including user-selected authentication challenges, images, and the like. Additionally, the customization information can also show customized images, text, color schemes, and/or other functionality options which may be particular to an entity affiliated with or associated with the user 104, in accordance with the customization information.

The method 400 may end following blocks 435, 455, 477, or 485.

The operations described and shown in the methods 300 and 400 of FIGS. 3A-3B and 4A-4B may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3A-3B and 4A-4B may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. One or more non-transitory computer-readable media storing computer-executable program code that, responsive to execution by one or more computer processors, causes operations to be performed for customizing a user interface presentation of a generic version of a mobile application downloaded on a mobile device, said method comprising:
   receiving a customization link from a mobile application system;
   launching the generic version of the mobile application responsive to invocation of the customization link;
   identifying, responsive to invocation of the customization link, an association identifier indicative of an association between a user of the mobile device and an entity with which the user is affiliated;
   transmitting, to a mobile application system responsive to identifying the association identifier, a request for customization information, wherein the request comprises the association identifier, wherein the customization information is associated with at least one of: i) the user or ii) the entity with which the user is affiliated, and wherein the customization information comprises at least one of: i) security information associated with the user or ii) branding information associated with the entity with which the user is affiliated;
   receiving, from the mobile application system, the customization information;
   customizing the user interface presentation of the generic version of the mobile application downloaded on the mobile device based at least in part on at least a portion of the customization information to generate a customized version of the mobile application comprising a customized user interface presentation; and
   presenting the customized user interface presentation of the customized version of the mobile application to the user via the mobile device.

2. The one or more computer-readable media of claim 1, wherein identifying the association identifier comprises receiving the association identifier as part of the invocation of the customization link.

3. The one or more computer-readable media of claim 1, wherein the association identifier comprises a token or a unique identifier.

4. The one or more computer-readable media of claim 1, wherein identifying the association identifier comprises retrieving the association identifier from local data storage of the mobile device.

5. The one or more computer-readable media of claim 1, wherein the received customization information is stored in local data storage of the mobile device for subsequent use.

6. The one or more computer-readable media of claim 1, wherein the customization information comprises the security information, and wherein the security information comprises at least one of: i) an authentication image selected by the user or ii) an authentication challenge presented to the user.

7. The one or more computer-readable media of claim 1, wherein the customization information comprises the branding information associated with the entity with which the user is associated, and wherein the branding information comprises at least one of: i) an image or a logo, ii) text, iii) one or more functionality options, or iv) one or more color schemes associated with the entity with which the user is affiliated.

8. The one or more computer-readable media of claim 1, wherein the entity with which the user is affiliated is a first entity, the association identifier is a first association identifier, the request is a first request, the customization information is first customization information, the customized version of the mobile application is a first customized version of the mobile application, and the customized user interface presentation is a first customized user interface presentation, the operations further comprising:
   identifying a second entity with which the user is affiliated;
   presenting respective information identifying the first entity and the second entity to the user via a user interface of the mobile application;
   receiving user input indicative of a selection of the second entity;
   transmitting, to the mobile application system responsive to receiving the user input indicative of the selection of the second entity, a second request for second customization information, wherein the second request comprises a second association identifier indicative of an association between the user and the second entity, and wherein the second customization information is associated with at least one of: i) the user or ii) the second entity;
   receiving, from the mobile application system, the second customization information;
   customizing the user interface presentation of the generic version of the mobile application based at least in part on the second customization information to generate a second customized version of the mobile application comprising a second customized user interface presentation; and
   presenting the second customized user interface presentation of the second customized version of the mobile application to the user via the mobile device.

9. The one or more computer-readable media of claim 1, wherein the first association identifier and the second association identifier are different identifiers, the operations further comprising at least one of:

receiving the second association identifier from the mobile application system or retrieving the second association identifier from local data storage of the mobile device.

10. A method for customizing a user interface presentation of a generic version of a mobile application, the method comprising:
receiving, by a mobile computing device comprising one or more computer processors, a customization link from a mobile application system;
launching, by the mobile computing device, the generic version of the mobile application response to invocation of the customization link;
identifying, by the computing device responsive to invocation of the customization link, an association identifier indicative of an association between a user of the mobile computing device and an entity with which the user is affiliated;
transmitting, by the mobile computing device to the mobile application system responsive to identifying the association identifier, a request for customization information, wherein the request comprises the association identifier, wherein the customization information is associated with at least one of: i) the user or ii) the entity with which the user is affiliated, and wherein the customization information comprises at least one of: i) security information associated with the user or ii) branding information associated with the entity with which the user is affiliated;
receiving, by the mobile computing device from the mobile application system, the customization information;
customizing, by the mobile device and based at least in part on at least a portion of the customization information, a user interface presentation of a generic version of the mobile application downloaded on the mobile device to generate a customized version of the mobile application comprising a customized user interface presentation; and
presenting, by the mobile computing device, the customized user interface presentation of the customized version of the mobile application to the user.

11. The method of claim 10,
wherein identifying the association identifier comprises receiving the association identifier as part of the invocation of the customization link that launches the generic version of the mobile application.

12. The method of claim 10, wherein the association identifier comprises a token or a unique identifier.

13. The method of claim 10, wherein identifying the association identifier comprises retrieving the association identifier from local data storage of the mobile computing device.

14. The method of claim 10, wherein the entity with which the user is affiliated is a first entity, the association identifier is a first association identifier, the request is a first request, the customization information is first customization information, the customized version of the mobile application is a first customized version of the mobile application, and the customized user interface presentation is a first customized user interface presentation, the method further comprising:
identifying, by the mobile computing device, a second entity with which the user is affiliated;
presenting respective information identifying the first entity and the second entity to the user via a user interface of the mobile application;
receiving, by the mobile computing device, user input indicative of a selection of the second entity;
transmitting, by the mobile computing device to the mobile application system responsive to receiving the user input indicative of the selection of the second entity, a second request for second customization information, wherein the second request comprises a second association identifier indicative of an association between the user and the second entity, and wherein the second customization information is associated with at least one of: i) the user or ii) the second entity;
receiving, by the mobile computing device from the mobile application system, the second customization information;
customizing, by the mobile computing device, the user interface presentation of the generic version of the mobile application based at least in part on the second customization information to generate a second customized version of the mobile application comprising a second customized user interface presentation; and
presenting, by the mobile computing device, the second customized user interface presentation of the second customized version of the mobile application to the user via the mobile device.

15. The method of claim 14, further comprising:
identifying, by the mobile computing device, a third entity with which the user is affiliated;
presenting information identifying the third entity to the user via the user interface of the mobile application;
receiving, by the mobile computing device, user input indicative of a selection of the third entity;
transmitting, by the mobile computing device to the mobile application system responsive to receiving the user input indicative of the selection of the third entity, a third request for third customization information;
receiving, by the mobile computing device from the mobile application system, a failure notification; and
removing the information identifying the third entity from the user interface of the mobile application.

16. A mobile device, comprising:
at least one memory operable to store computer-executable instructions; and
at least one processor configured to access the at least one memory and execute the computer-executable instructions to:
receive a customization link from a mobile application system;
launch a generic version of a mobile application downloaded on the mobile device responsive to invocation of the customization link;
identify, responsive to invocation of the customization link, an association identifier indicative of an association between a user of the mobile device and an entity with which the user is affiliated;
transmit, to a mobile application system responsive to identifying the association identifier, a request for customization information, wherein the request comprises the association identifier, wherein the customization information is associated with at least one of: i) the user or ii) the entity with which the user is affiliated, and wherein the customization information comprises at least one of: i) security information associated with the user or ii) branding information associated with the entity with which the user is affiliated;
receive, from the mobile application system, the customization information;
customize a user interface presentation of the generic version of the mobile application based at least in part on the customization information to generate a customized version of the mobile application comprising a customized user interface presentation; and present the customized user interface presentation of the customized version of the mobile application to the user.

17. The one or more computer-readable media of claim 8, wherein the first association identifier and the second association identifier are a same identifier, the operations further comprising:
- receiving, from the mobile application system, an indication that the second entity is associated with the first association identifier,
- wherein the second request comprises an indication of the second entity.

18. The one or more computer-readable media of claim 1, wherein the entity with which the user is affiliated is a first entity, the operations further comprising:
- identifying a second entity with which the user is affiliated;
- presenting information identifying the first entity and the second entity to the user via a user interface of the mobile application; and
- receiving user input indicative of a selection of the first entity,
- wherein the request for customization information is further transmitted responsive to receiving the user input indicative of the selection of the first entity.

19. The one or more computer-readable media of claim 1, the operations further comprising:
- receiving download information for downloading the generic version of the mobile application to the mobile device, wherein the download information comprises a download link and the association identifier, and wherein the download information is received in accordance with one or more delivery preferences specified by the user;
- receiving an indication of user invocation of the download link;
- transmitting a request to download the generic version of the mobile application responsive to receiving the indication of user invocation of the download link, wherein the request to download comprises the association identifier.

20. The one or more computer-readable media of claim 1, wherein the association identifier is embedded in the download link.

* * * * *